(12) United States Patent
Chien et al.

(10) Patent No.: US 10,540,474 B2
(45) Date of Patent: Jan. 21, 2020

(54) CHIP TEMPERATURE COMPUTATION METHOD AND CHIP TEMPERATURE COMPUTATION DEVICE

(71) Applicant: Industrial Technology Research Institute, Hsinchu (TW)

(72) Inventors: Heng-Chieh Chien, Miaoli County (TW); Sheng-Tsai Wu, Taoyuan (TW); Ming-Ji Dai, Hsinchu (TW); Chih-Ming Shen, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 68 days.

(21) Appl. No.: 15/922,910

(22) Filed: Mar. 15, 2018

(65) Prior Publication Data

US 2019/0188357 A1 Jun. 20, 2019

(30) Foreign Application Priority Data

Dec. 15, 2017 (TW) .............................. 106144128 A

(51) Int. Cl.
*G06F 17/50* (2006.01)

(52) U.S. Cl.
CPC ...... *G06F 17/5081* (2013.01); *G06F 17/5009* (2013.01); *G06F 2217/40* (2013.01); *G06F 2217/80* (2013.01)

(58) Field of Classification Search
CPC ............. G06F 17/5081; G06F 17/5009; G06F 2217/80
USPC ....................................................... 716/136
See application file for complete search history.

(56) References Cited

U.S. PATENT DOCUMENTS

| | | | |
|---|---|---|---|
| 6,438,504 B2 | 8/2002 | Mikubo et al. | |
| 7,353,471 B1* | 4/2008 | Chandra et al. .... | G06F 17/5009 716/111 |
| 7,366,997 B1 | 4/2008 | Rahmat et al. | |
| 7,383,520 B2 | 6/2008 | Chandra | |
| 7,472,363 B1* | 12/2008 | Chandra ............. | G06F 17/5009 716/106 |
| 7,823,102 B2 | 10/2010 | Chandra et al. | |
| 7,941,779 B2 | 5/2011 | Rahmat et al. | |
| 8,352,230 B2* | 1/2013 | Kim et al. .......... | G06F 17/5018 703/13 |
| 8,510,694 B2 | 8/2013 | Hsieh et al. | |
| 8,572,535 B2 | 10/2013 | Rahmat et al. | |
| 8,701,073 B1* | 4/2014 | Fu et al. ................. | G06F 17/50 716/106 |

(Continued)

FOREIGN PATENT DOCUMENTS

CN 107004060 8/2017

OTHER PUBLICATIONS

"Office Action of Taiwan Counterpart Application," dated Sep. 6, 2018, pp. 1-5.

(Continued)

*Primary Examiner* — Sun J Lin
(74) *Attorney, Agent, or Firm* — JCIPRNET

(57) ABSTRACT

A chip temperature computation method and a chip temperature computation device are provided. The chip temperature computation method includes: computing an upper layer thermal resistance and a lower layer thermal resistance of a chip, computing a total thermal resistance of the chip, and computing a temperature of the chip according to the total thermal resistance.

15 Claims, 5 Drawing Sheets

(56) References Cited

U.S. PATENT DOCUMENTS

| | | |
|---|---|---|
| 8,881,088 B2 | 11/2014 | Rahmat et al. |
| 9,323,870 B2 | 4/2016 | Chandra |
| 10,222,272 B2 * | 3/2019 | Kuwahara et al. ..... G06F 1/325 |
| 2008/0066022 A1 | 3/2008 | Chandra |
| 2008/0168406 A1 | 7/2008 | Rahmat et al. |
| 2011/0209113 A1 | 8/2011 | Rahmat et al. |
| 2013/0298101 A1 | 11/2013 | Chandra |
| 2014/0053124 A1 | 2/2014 | Rahmat et al. |
| 2015/0268101 A1 * | 9/2015 | Kuwahara et al. ..... G06F 1/325 374/178 |

OTHER PUBLICATIONS

Wei; Hsiu-Ping, et al, "Failure Mode and Thermal Performance Analysis of Stacked Panel Level Package (PLP)," ASME 2007 InterPACK Conforence, No. IPACK2007-33368, Jul. 2007, pp. 1-10.

* cited by examiner

CHIP TEMPERATURE COMPUTATION METHOD AND CHIP TEMPERATURE COMPUTATION DEVICE

CROSS-REFERENCE TO RELATED APPLICATION

This application claims the priority benefit of Taiwan application serial no. 106144128, filed on Dec. 15, 2017. The entirety of the above-mentioned patent application is hereby incorporated by reference herein and made a part of this specification.

TECHNICAL FIELD

The disclosure relates to a chip temperature computation method and a chip temperature computation device, and relates to a chip temperature computation method and a chip temperature computation device computing a chip temperature within a package structure by dividing the package structure into layers and solving thermal resistances of the respective layers.

BACKGROUND

In stages of chip design and package design, a complete design flow generally includes defining a product, analyzing the performance, and verifying the performance. At the product definition phase, the form of the product is defined and chosen mostly based on the engineer's experience together with a quick performance estimation tool or simulation with a simplified model. Currently, the accuracy of the quick performance estimation tool is not high enough (e.g., lower than 90%), and the simulation with a simplified model is time consuming (e.g., over 10 minutes). The accuracy and the time required make it challenging to come up with a design that optimizes the performance at the early stage of product design.

At the early stage of chip design, the power consumption performance of the chip is known. However, since it is difficult to define the form and the performance of the package beforehand, it is difficult to estimate the temperature performance of the chip under the conditions of the package and the system chosen in practice. Traditional product development adopts a sequential flow, where the assembly house handles the package design after the chip is developed. Afterwards, the product system is designed. According to the sequential flow, some performance issues may only arise during the intermediate or late stage of development. Hence, the designer can only adopt remedial measures, and it is difficult to optimize the design of the product.

Known methods for evaluating the chip temperature include detailed model simulation, equivalent model simulation, and compact thermal model evaluation. Detailed model simulation is highly accurate, but is time-consuming and requires a large amount of computational resources. Equivalent model simulation is moderately accurate, but still takes quite a while. Compact thermal model evaluation also takes time, and its accuracy is rather unstable. Thus, how to design a platform tool for the early stage of product development to provide a sufficiently accurate performance estimation analysis within a short period of time to avoid over-/under-design of the product remains an issue to work on.

SUMMARY

One or some exemplary embodiments of the disclosure provides a chip temperature computation method and a chip temperature computation device capable of reducing the time required to compute a chip package in a package structure while still rendering a high accuracy.

An exemplary embodiment of the disclosure provides a chip temperature computation method for computing a temperature of a chip in a package structure. The chip package includes a chip, at least one upper layer of the chip, and a plurality of lower layers of the chip. The chip temperature computation method includes: computing an upper layer thermal resistance corresponding to the at least one upper layer and a lower layer thermal resistance corresponding to the lower layers; and computing a total thermal resistance of the chip based on the upper layer thermal resistance and the lower layer thermal resistance, and computing a temperature of the chip based on the total thermal resistance. Computing the lower layer thermal resistance includes: building a thermal resistance performance database and an equivalent material parameter of each of the lower layers; obtain a boundary condition of an $N^{th}$ layer of the lower layers; and obtaining a thermal resistance of the $N^{th}$ layer based on the boundary condition and the equivalent material parameter of the $N^{th}$ layer and the thermal resistance performance database of the $N^{th}$ layer, and converting the thermal resistance of the $N^{th}$ layer into the boundary condition of an $N+1^{th}$ layer of the lower layers, wherein a distance between the $N^{th}$ layer and the chip is greater than a distance between the $N+1^{th}$ layer and the chip.

According to an embodiment of the disclosure, computing the lower layer thermal resistance further includes: obtaining the lower layer thermal resistance by adding up the thermal resistances of the respective lower layers and adding a boundary condition thermal resistance corresponding to the lower layers, wherein the boundary condition thermal resistance is obtained based on the boundary condition of a first layer of the lower layers and a cross-sectional area of the first layer.

According to an embodiment of the disclosure, computing the upper layer thermal resistance includes: building the thermal resistance performance database and the equivalent material parameter of the at least one upper layer; obtaining the boundary condition of an $M^{th}$ layer of the at least one upper layer; obtaining the thermal resistance of the $M^{th}$ layer based on the boundary condition and the equivalent material parameter of the $M^{th}$ layer and the thermal resistance performance database of the $M^{th}$ layer, and converting the thermal resistance of the $M^{th}$ layer into the boundary condition of an $M+1^{th}$ layer of the at least one upper layer, wherein a distance between the $M^{th}$ layer and the chip is greater than a distance between the $M+1^{th}$ layer and the chip; and obtaining the upper layer thermal resistance based on the thermal resistance of each of the at least one upper layer.

According to an embodiment of the disclosure, converting the thermal resistance of the $N^{th}$ layer into the boundary condition of the $N+1^{th}$ layer of the lower layers includes: obtaining the boundary condition of the $N+1^{th}$ layer based on the thermal resistance of the $N^{th}$ layer and a cross-sectional area of the $N+1^{th}$ layer, or obtaining the boundary condition of the $N+1^{th}$ layer based on the thermal resistance of the $N^{th}$ layer, the thermal resistance of an $N-1^{th}$ layer, and the cross-sectional area of the $N+1^{th}$ layer.

According to an embodiment of the disclosure, obtaining the thermal resistance of the $N^{th}$ layer based on the boundary condition and the equivalent material parameter of the $N^{th}$ layer and the thermal resistance performance database of the $N^{th}$ layer includes: inputting the boundary condition and the equivalent material parameter of the $N^{th}$ layer into the thermal resistance performance database of the $N^{th}$ layer, and obtaining the thermal resistance of the $N^{th}$ layer based on a machine learning module, wherein the machine learning module includes a neural network algorithm, a decision tree algorithm, or a random forest algorithm.

According to an embodiment of the disclosure, the thermal resistance performance database of each of the lower layers is built by adopting an analytical solution, a semi-empirical solution, or a computer simulation method.

According to an embodiment of the disclosure, the at least one upper layer includes a mold layer, and the lower layers include a printed circuit board (PCB) layer, a bump layer, and a redistribution layer.

An exemplary embodiment of the disclosure provides a chip temperature computation device for computing a temperature of a chip in a package structure. The chip package includes a chip, at least one upper layer of the chip, and a plurality of lower layers of the chip. The chip temperature computation device includes a processor and a memory coupled to the processor. The processor is configured to: obtain a lower layer thermal resistance corresponding to the lower layers based on a boundary condition, a thermal resistance performance database, and an equivalent material parameter of each of the lower layers; obtain an upper layer thermal resistance corresponding to the upper layer based on the boundary condition, the thermal resistance database, and the equivalent material parameter of the at least one upper layer; and computing a temperature of the chip based on the lower layer thermal resistance and the upper layer thermal resistance, wherein a thermal resistance of an $N^{th}$ layer of the lower layers is associated with the boundary condition of an $N+1^{th}$ layer of the lower layers, and a distance between the $N^{th}$ layer and the chip is greater than a distance between the $N+1^{th}$ layer and the chip.

According to an embodiment of the disclosure, the processor obtains the boundary condition of the $N^{th}$ layer of the lower layers, obtains the thermal resistance of the $N^{th}$ layer based on the boundary condition and the equivalent material parameter of the $N^{th}$ layer and the thermal resistance performance database of the $N^{th}$ layer, and convert the thermal resistance of the Nth layer into the boundary condition of the N+1th layer of the lower layers, and obtains the lower layer thermal resistance based on the thermal resistance of each of the lower layers.

According to an embodiment of the disclosure, the processor obtains the lower layer thermal resistance by adding up the thermal resistances of the respective lower layers and adding a boundary condition thermal resistance corresponding to the lower layers. The boundary condition thermal resistance is obtained based on the boundary condition of a first layer of the lower layers and a cross-sectional area of the first layer.

According to an embodiment of the disclosure, the processor builds the thermal resistance performance database and the equivalent material parameter of the at least one upper layer, obtains the boundary condition of an $M^{th}$ layer of the at least one upper layer, obtains the thermal resistance of the $M^{th}$ layer based on the boundary condition and the equivalent material parameter of the $M^{th}$ layer and the thermal resistance performance database of the $M^{th}$ layer, and converts the thermal resistance of the $M^{th}$ layer into the boundary condition of an $M+1^{th}$ layer of the at least one upper layer. In addition, a distance between the $M^{th}$ layer and the chip is greater than a distance between the $M+1^{th}$ layer and the chip; and obtaining the upper layer thermal resistance based on the thermal resistance of each of the at least one upper layer.

According to an embodiment of the disclosure, the processor obtains the boundary condition of the $N+1^{th}$ layer based on the thermal resistance of the $N^{th}$ layer and a cross-sectional area of the $N+1^{th}$ layer, or obtains the boundary condition of the $N+1^{th}$ layer based on the thermal resistance of the $N^{th}$ layer, the thermal resistance of an $N-1^{th}$ layer, and the cross-sectional area of the $N+1^{th}$ layer.

According to an embodiment of the disclosure, the processor inputs the boundary condition and the equivalent material parameter of the $N^{th}$ layer into the thermal resistance performance database of the $N^{th}$ layer, and obtains the thermal resistance of the $N^{th}$ layer based on a machine learning module. In addition, the machine learning module includes a neural network algorithm, a decision tree algorithm, or a random forest algorithm.

According to an embodiment of the disclosure, the thermal resistance performance database of each of the lower layers is built by adopting an analytical solution, a semi-empirical solution, or a computer simulation method.

According to an embodiment of the disclosure, the at least one upper layer includes a mold layer, and the lower layers include a printed circuit board (PCB) layer, a bump layer, and a redistribution layer.

Based on the above, in the chip temperature computation method and the chip temperature computation device according to the embodiments of the disclosure, the upper layer thermal resistance and the lower layer thermal resistance of the chip in the package structure are computed to obtain the total thermal resistance of the chip. In addition, the chip temperature is computed based on the total thermal resistance. During building of the thermal resistance performance database, the package structure is divided into structures of a plurality of layers, and the thermal resistance performance databases of the respective layers, instead of the thermal resistance performance database of the whole package structure, are built, so as to reduce the amount of data recorded in the performance database. With the thermal resistance performance databases of the respective layers, the thermal resistance performances of the respective layers may be obtained, and the thermal resistance of a layer is converted into the boundary condition of another layer above the layer to compute the thermal resistance performance of the another layer above the layer. Accordingly, the upper layer thermal resistance and the lower layer thermal resistance of the chip within the package structure are able to be computed quickly, the total thermal resistance of the chip is thus obtained, and the chip temperature is thus computed.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
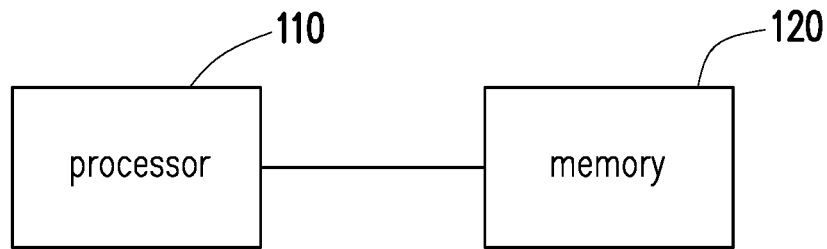
FIG. 1 is a block diagram illustrating a chip temperature computation device according to an embodiment of the disclosure.

Hereinafter, terms such as "and/or" includes any and all combinations of one or more of the associated listed items. When an expression such as "at least one of" is prefixed a list of components, such expression serves to modify the whole list, instead of modifying individual components in the list. Therefore, the exemplary embodiments may be subjected to various modifications and substitutions of components, and embodiments thereof are shown in the drawings by way of examples and will be described herein in detail. However, it should be understood that there is no intent to limit the exemplary embodiments to particular forms disclosed herein. Instead, the exemplary embodiments serve to cover all the modifications, equivalents, and alternates falling within the scope of the disclosure. In the descriptions of the disclosure, detailed descriptions about some known functions or structures that may carry away the focus of the disclosure may be omitted. It should also be understood that, while terms such as "first", "second", and/or the like may be used to describe various components, the components are not limited by these terms. These terms merely serve to distinguish one component from another. It should also be understood that, when a component/layer is described as being "formed on" or "located on" another component/layer, the component/layer may be construed as being directly or indirectly formed/located on the another component/layer. In other words, an intermediate component/layer may be disposed therebetween. The disclosure will be described in greater detail with reference to the drawings illustrating the exemplary embodiments of the disclosure. Like or similar components in the drawings are marked with like or similar reference symbols, and repeated descriptions about the like or similar components will not be repeated. For a clearer illustration, the thicknesses between layers and regions are enlarged in the drawings. Furthermore, in the drawings, the thicknesses between layers and regions may be exaggerated for the ease of description.

FIG. 1 is a block diagram illustrating a chip temperature computation device according to an embodiment of the disclosure.

Referring to FIG. 1, a temperature computation device 100 according to an embodiment of the disclosure includes a processor 110 and a memory 120 coupled to the processor 110.

The processor 110 may be a central processing unit (CPU) or other programmable general-purpose or specific purpose microprocessors, digital signal processors (DSP), programmable controllers, application specific integrated circuits (ASICs), other similar devices, or a combination thereof.

The memory 120 may be any type of fixed or mobile random access memory (RAM), read-only memory (ROM), flash memory, hard disk drive (HDD), solid state drive (SSD), similar devices, or a combination thereof.

In an embodiment, the processor 110 may execute operations such as machine learning, computing a chip temperature, building a layered thermal resistance performance database, and/or the like described in the following, and the layered thermal resistance performance database and a machine learning module may be stored in the memory 120. In another embodiment, the machine learning module may also be implemented as a computation circuit.

Figure 2A:
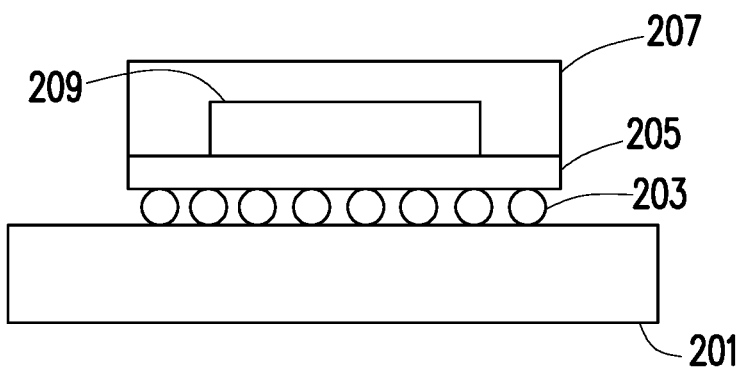
FIGS. 2A and 2B are schematic view illustrating a package structure according to an embodiment of the disclosure.
Figure 2B:
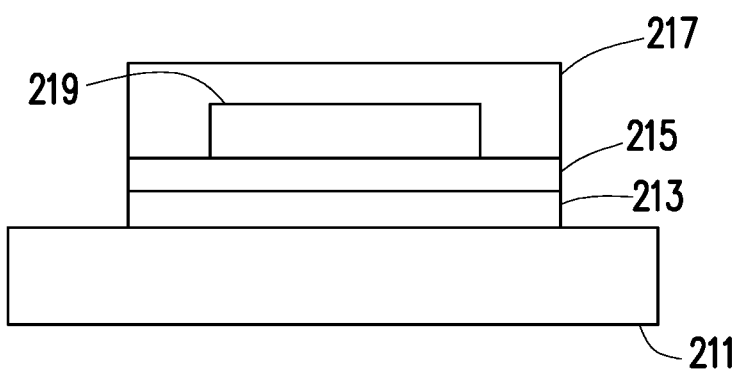

FIGS. 2A and 2B are schematic view illustrating a package structure according to an embodiment of the disclosure.

Referring to FIG. 2A, FIG. 2A illustrates an actual package structure to be analyzed according to an embodiment of the disclosure. The actual package structure to be analyzed includes a printed circuit board layer 201, a bump layer 203, a redistribution layer 205, a mold layer 207, and a chip 209. The bump layer 203 may include a ball grid array (BGA) package. Before computing the chip temperature, the processor 110 may firstly convert the actual package structure to be analyzed shown in FIG. 2A into a simplified equivalent structure shown in FIG. 2B. The simplified equivalent structure includes a printed circuit board layer equivalent structure 211, a bump layer equivalent structure 213, a redistribution layer equivalent structure 215, a mold layer equivalent structure 217, and a chip 219.

Figure 3:
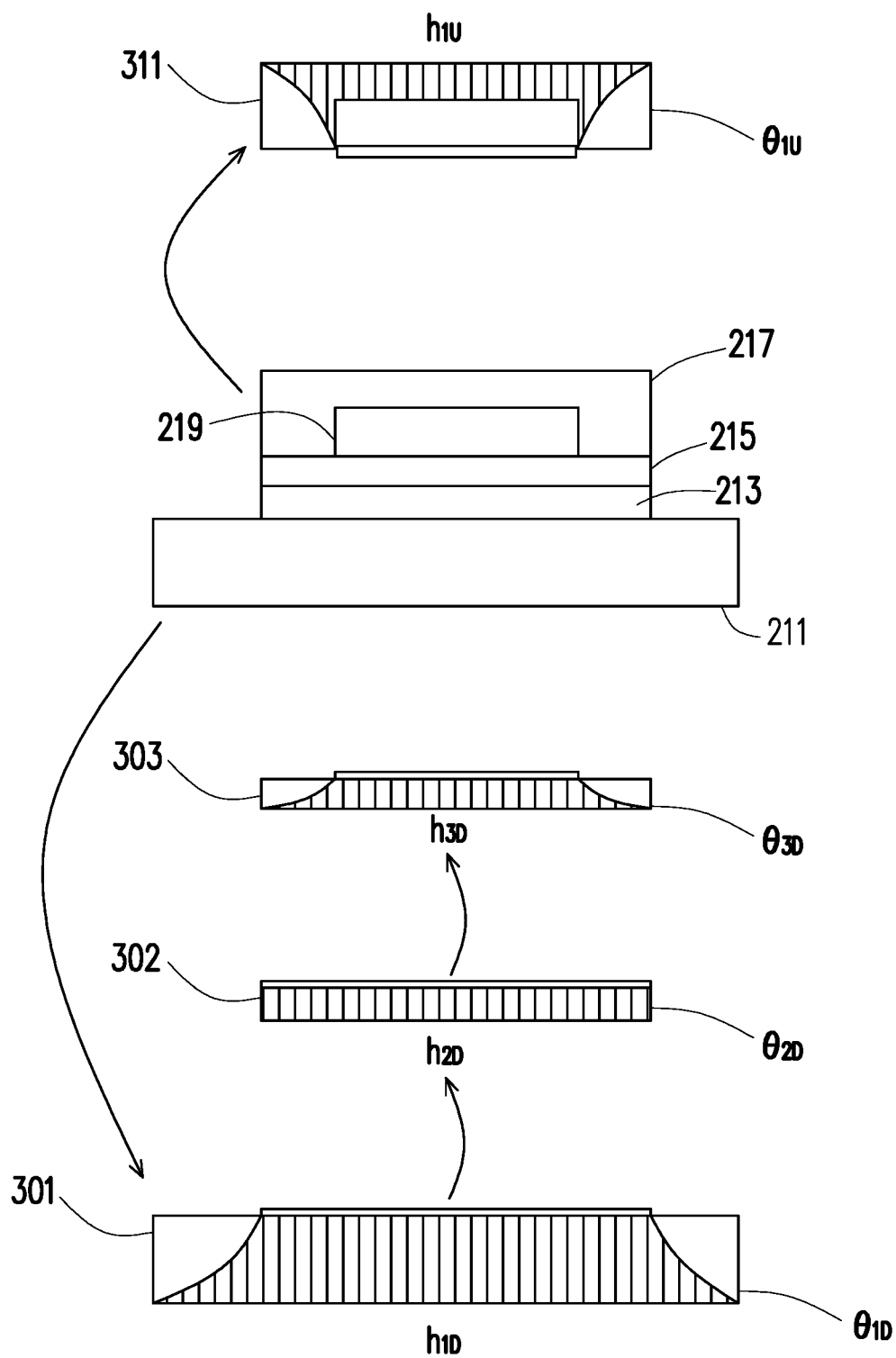
FIG. 3 is a schematic view illustrating a layered structure of a package structure according to an embodiment of the disclosure.

FIG. 3 is a schematic view illustrating a layered structure of a package structure according to an embodiment of the disclosure.

Specifically, according to a chip temperature computation method according to the embodiment, the package structure is divided into a plurality of separate layers in a vertical direction of the chip, such as a first lower separate layer 301, a second lower separate layer 302, a third lower separate layer 303, and a first upper separate layer 311. The first lower separate layer 301, the second lower separate layer 302, the third lower separate layer 303, and the first upper separate layer 311 respectively correspond to the printed circuit board layer equivalent structure 211, the bump layer equivalent structure 213, the redistribution layer equivalent structure 215, and the mold layer equivalent structure 217 in the package structure.

Firstly, the processor 110 may input a boundary condition $h_{1D}$ of the separate layer 301 into the machine learning module (i.e., a thermal resistance solver) to solve a thermal resistance $\theta_{1D}$ of the first separate layer 301 and obtain a temperature of an upper surface of the first separate layer 301. The machine learning module may carry out neural network computation, decision tree computation, or random forest computation to obtain a thermal resistance of the separate layer based on the boundary condition of the separate layer and parameters such as the material and/or size of the separate layer. In an embodiment, $h_{1D}$ may be set to range from 3 W/m$^2$K to 20 W/m$^2$K when the first lower separate layer 301 meets the condition of natural convection. In another embodiment, $h_{1D}$ may be set to be greater than 50 W/m$^2$K when the first lower separate layer 301 meets the condition of forced convection (i.e., a condition where there is an air flow passing through but no heat dissipation device is provided).

Then, the processor 110 may convert the thermal resistance $\theta_{1D}$ of the first lower separate layer 301 into a boundary condition $h_{2D}$ of the second lower separate layer 302, and input the boundary condition $h_{2D}$ of the second lower separate layer 302 into the machine learning module to solve a thermal resistance $\theta_{2D}$ of the second lower separate layer 302 and obtain a temperature of an upper surface of the second lower separate layer 302. Similarly, the processor 110 may convert the thermal resistance $\theta_{2D}$ of the second lower separate layer 302 into a boundary condition $h_{3D}$ of the third lower separate layer 303, and input the boundary condition $h_{3D}$ of the third lower separate layer 303 into the machine learning module to solve a thermal resistance $\theta_{3D}$ of the third lower separate layer 303 and obtain a temperature of an upper surface of the third lower separate layer 303.

Details of converting the thermal resistance of a separate layer into the boundary condition of another separate layer above the separate layer will be described in the following. Since the temperature of the upper surface of a separate layer may be obtained based on the thermal resistance of the separate layer and the power of the chip, converting the thermal resistance of a separate layer into the boundary condition of another separate layer above the separate layer may also be considered as converting the temperature of the upper surface of a separate layer into the boundary condition of another separate layer above the separate layer.

Besides, the processor 110 may also input the boundary condition $h_{1U}$ of the first upper separate layer 311 into the machine learning module to solve a thermal resistance $\theta_{1U}$ of the first upper separate layer 311. In an embodiment, $h_{1U}$ may be set to range from 3 W/m²K to 20 W/m²K when the first upper separate layer 311 meets the condition of natural convection. In another embodiment, $h_{1U}$ may be set to be greater than 50 W/m²K when the first lower separate layer 311 meets the condition of forced convection (i.e., a condition where there is an air flow passing through but no heat dissipation device is provided). In another embodiment, $h_{1U}$ may be set as $h_{1U}=1/(\theta_{heatsink} \times A)$ when the first upper separate layer 311 contacts a heat dissipation device, wherein $\theta_{heatsink}$ represents a thermal resistance performance of the heat dissipation device, and A represents an area where the heat dissipation device contacts the first upper separate layer 311 (i.e., the mold layer).

Accordingly, the processor 110 may obtain a thermal resistance $\theta_D = \theta_{1D} + \theta_{2D} + \theta_{3D}$ in a lower direction of the chip 219 (i.e., a linear direction perpendicular to a lower surface of the chip 219) and obtain a thermal resistance $\theta_U = \theta_{1U}$ in an upper direction of the chip 219 (i.e., a linear direction perpendicular to an upper surface of the chip 219), and obtain a total thermal resistance $$\theta_{chip} = \frac{1}{\frac{1}{\theta_D} + \frac{1}{\theta_U}}$$

based on $\theta_D$ and $\theta_U$.

In the embodiment, the processor 110 may substitute the thermal resistances $\theta_D$ and $\theta_U$ on two sides of the chip 219 into a chip model to carry out a simulation on temperature distribution of the chip or compute an average chip temperature $T_{chip} = P_{chip} \times \theta_{chip} + T_{amb}$, wherein $P_{chip}$ represents power consumption of the chip, and $T_{amb}$ represents ambient temperature.

Figure 4:
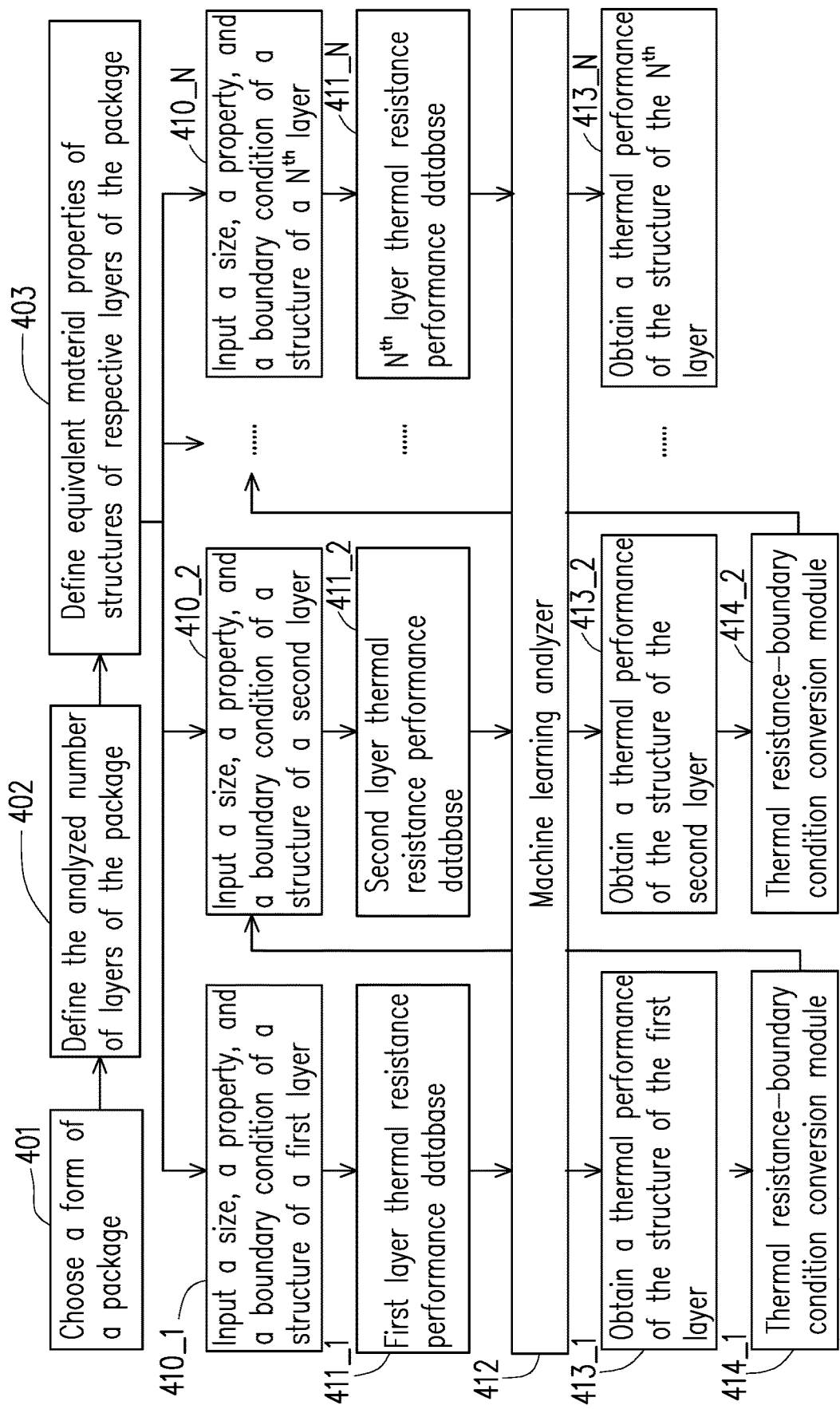
FIG. 4 is a flowchart illustrating a layered thermal resistance computation method according to an embodiment of the disclosure.

FIG. 4 is a flowchart illustrating a layered thermal resistance computation method according to an embodiment of the disclosure.

Referring to FIG. 4, at Step S401, a form of a package of a chip is chosen. At Step S402, the analyzed number of layers of the package is defined. At Step S403, an equivalent material property of a structure of each of the layers is defined. At Step S410_1, a size, a property (i.e., an equivalent material parameter), and a boundary condition of a structure of a first layer are input to a first layer thermal resistance performance database of the first layer at Step S411_1. Then, through computation of a machine learning analyzer (i.e., a machine learning module), a thermal resistance performance of the structure of the first layer is obtained at Step S413_1. After the thermal resistance performance of the structure of the first layer is obtained, a thermal resistance of the first layer is converted into a boundary condition of a second layer at Step S414_1 to serve as a boundary condition input at Step S410_2. The first layer to an $N_{th}$ layer of the embodiment are separate layers above or below the chip in the package structure. The first layer is most distant from the chip, while the $N_{th}$ layer is closest to the chip.

Through multiple iterations, a thermal resistance performance of a structure of the $N_{th}$ layer may be obtained at Step S413_N. After obtaining the thermal resistances of all the separate layers, a total thermal resistance of the package and a chip temperature may be computed. Details concerning computation of the total thermal resistance of the package are already described above with reference to FIG. 3, and thus will not be repeated in the following.

By building the thermal resistance performance databases of the respective separate layers, a total amount of data of a performance database for the whole package structure is significantly reduced. For example, if it requires 19 features (such as lengths, widths, heights, and thermal conduction coefficients of the respective layers) to sufficiently describe the whole package structure, and each feature has four variables, the performance database of the whole package structure may be to store $4^{19}$ entries of data, which is a large amount of data. If the same package structure is divided into three layers, the three layers respectively have seven, five, and seven features, and each of the features has four variables, the performance databases of the respective layers may be to respectively store $4^7=16384$, $4^5=1024$, and $4^7=16384$ entries of data. Since the amount of data is significantly reduced, the time required to compute the thermal resistances of the respective layers may also be significantly shorter than the time required to compute the total thermal resistance of the package structure directly based on the performance database of the whole package structure.

In the embodiment, the thermal resistance performance databases of the respective layers may be built by adopting an analytical solution, a semi-empirical solution, or a computer simulation method. Table 1 in the following serves as an example of the thermal resistance performance database. In the embodiment, the thermal resistance performance database may include feature values about boundary condition, length of thermal source, width of thermal source, length of carrier, width of carrier, thickness of carrier, lateral thermal conduction, and longitudinal thermal conduction and corresponding thermal resistance performance results. Each feature value includes a plurality of variables. For example, in Table 1, the boundary condition may include values of 5, 8, 12, 3, and 20.

TABLE 1

| Number of Entries | Boundary Condition | Length of Thermal Source | Width of Thermal Source | Length of Carrier | Width of Carrier | Thickness of Carrier | Lateral Thermal Conduction | Longitudinal Thermal Conduction | Thermal Resistance Performance |
|---|---|---|---|---|---|---|---|---|---|
| 1 | 5 | 6 | 6 | 50 | 50 | 0.6 | 20 | 0.3 | 34.679 |
| 2 | 5 | 6 | 6 | 50 | 50 | 0.6 | 20 | 0.5 | 30.011 |
| 3 | 5 | 6 | 6 | 50 | 50 | 1.6 | 20 | 0.3 | 30.055 |
| 4 | 5 | 6 | 6 | 50 | 50 | 1.6 | 20 | 0.5 | 23.374 |
| 5 | 8 | 9 | 9 | 70 | 70 | 1.2 | 20 | 0.5 | 17.24 |
| 6 | 8 | 9 | 9 | 70 | 70 | 1.2 | 20 | 1 | 14.093 |
| 7 | 12 | 12 | 12 | 50 | 50 | 1.6 | 35 | 1 | 5.72 |
| 8 | 12 | 12 | 12 | 50 | 50 | 1.6 | 35 | 1.2 | 5.285 |
| 9 | 15 | 12 | 12 | 120 | 120 | 1 | 35 | 1.2 | 9.331 |
| 10 | 15 | 12 | 12 | 120 | 120 | 1 | 35 | 1.6 | 8.954 |
| 11 | 3 | 9 | 9 | 90 | 90 | 0.6 | 50 | 1.2 | 11.245 |
| 12 | 3 | 9 | 9 | 90 | 90 | 0.6 | 50 | 1.6 | 10.843 |
| . | . | . | . | . | . | . | . | . | . |
| . | . | . | . | . | . | . | . | . | . |
| . | . | . | . | . | . | . | . | . | . |
| 46651 | 20 | 20 | 20 | 150 | 150 | 1.6 | 90 | 0.3 | 4.226 |
| 46652 | 20 | 20 | 20 | 150 | 150 | 1.6 | 90 | 0.5 | 3.381 |

Figure 5:
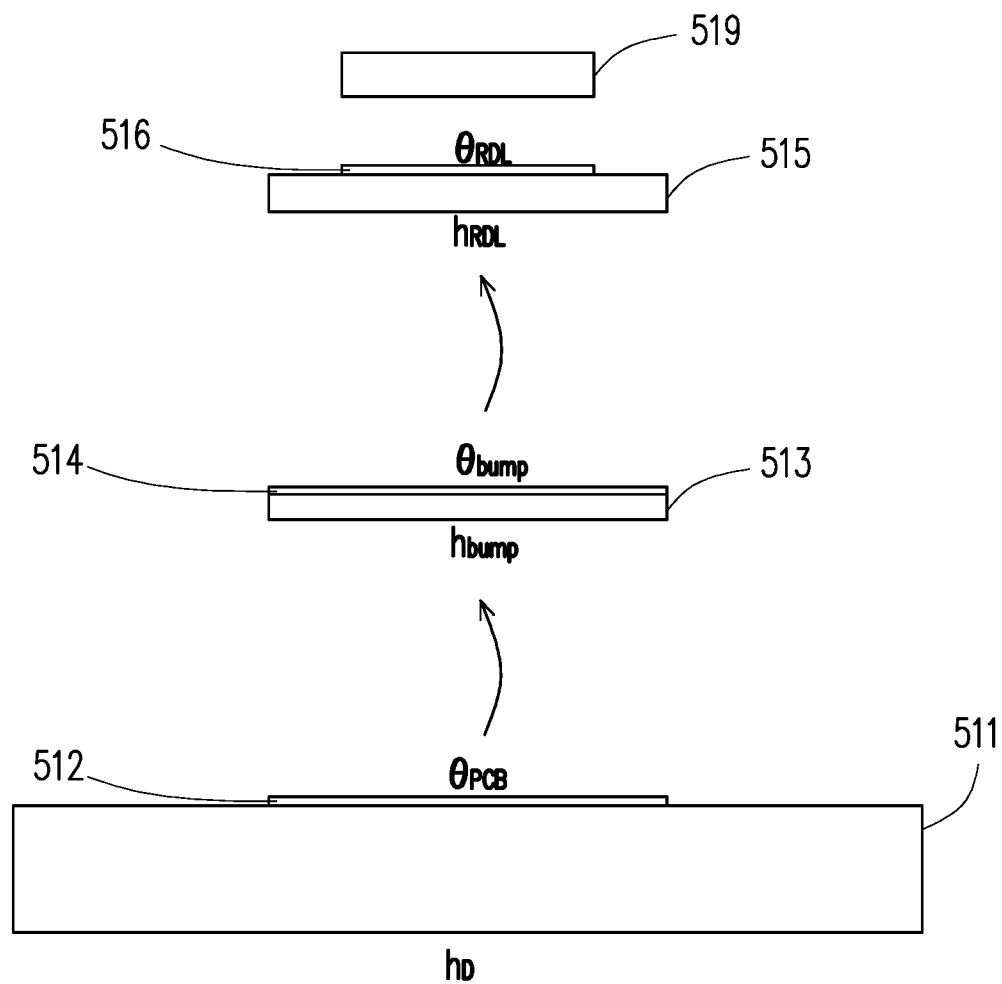
FIG. 5 is a schematic view illustrating conversion between a thermal resistance and a boundary condition according to an embodiment of the disclosure.

FIG. 5 is a schematic view illustrating conversion between a thermal resistance and a boundary condition according to an embodiment of the disclosure.

Referring to FIG. 5, FIG. 5 illustrates a printed circuit board layer equivalent structure 511, a bump layer (or a solder layer) equivalent structure 513, a redistribution layer equivalent structure 515, and a chip 519. A boundary condition corresponding to the printed circuit board layer equivalent structure 511 is $h_D$, and a thermal resistance value (i.e., a boundary condition thermal resistance) corresponding to the boundary condition $h_D$ is $$\theta_{h_D} = \frac{1}{h_D A_{PCB}},$$

wherein $A_{PCB}$ is a cross-sectional area of the printed circuit board layer equivalent structure 511. A boundary condition of the bump layer equivalent structure 513 may be obtained through conversion from a thermal resistance of the printed circuit board equivalent structure 511, such as $$h_{bump} = \frac{1}{\theta_{PCB} A_{bump}},$$

wherein $A_{bump}$ is a cross-sectional area of the bump layer equivalent structure 513. A boundary condition of the redistribution layer equivalent structure 515 may be obtained through conversion from a thermal resistance of the bump layer equivalent structure 513 in addition to a portion of the thermal resistance of the printed circuit board layer equivalent structure 511, such as $$h_{RDL} = \frac{1}{(C_0 \cdot \theta_{PCB} + \theta_{bump}) A_{RDL}},$$

wherein $A_{RDL}$ is a cross-sectional area of the redistribution layer equivalent structure 515, and $C_0$ may be a semi-empirical solution generated through a regression analysis. In an embodiment, $C_0$ may be a function including parameters such as $\theta_{PCB}$, under $A_{chip}$, and under $A_{bump}$, i.e., $C_0 = f(\theta_{PCB}, \text{under } A_{chip}, \text{under } A_{bump})$, wherein under $A_{chip}$ is a cross-sectional area of a lower surface of the chip 519, and under $A_{bump}$ is a cross-sectional area of a lower surface of the bump layer equivalent structure 513. In the embodiment, each of a thermal source 512, a thermal source 514, and a thermal source 516 represents a contact area between a separate layer and another separate layer above the separate layer, i.e., a cross-sectional area where a heat flux generated by the chip 519 passes through each of the separate layers.

Figure 6:
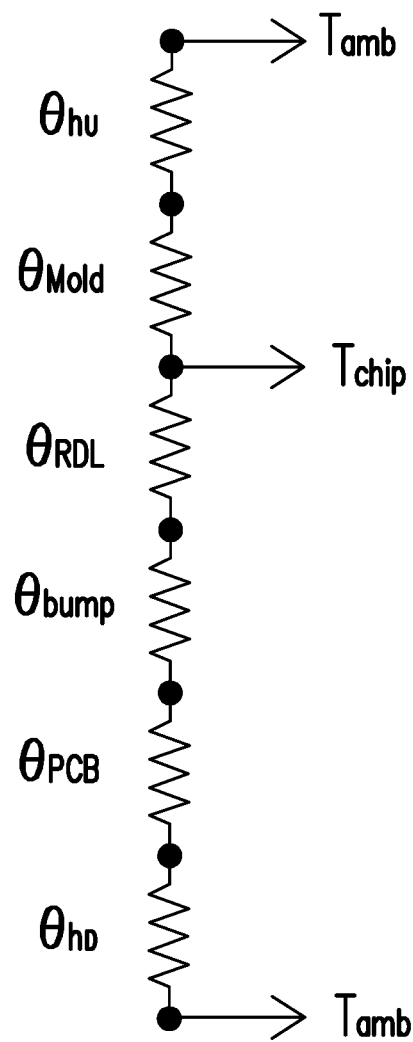
FIG. 6 is a schematic view illustrating layered thermal resistances of a chip according to an embodiment of the disclosure.

FIG. 6 is a schematic view illustrating layered thermal resistances of a chip according to an embodiment of the disclosure.

Referring to FIGS. 5 and 6 at the same time, a lower layer thermal resistance $\theta_D = \theta_{RDL} + \theta_{bump} + \theta_{PCB} + \theta_{h_D}$ of the chip 519 may be computed based on FIG. 5. Similar to FIG. 5, an upper layer thermal resistance $\theta_U = \theta_{Mold} + \theta_{h_U}$ of the chip 519 may also be computed. By computing the upper layer and lower layer thermal resistances of the chip 519 in parallel, a total thermal resistance $$\theta_{chip} = \frac{1}{\frac{1}{\theta_D} + \frac{1}{\theta_U}}$$

of the chip 519 to the external may be obtained, and the chip temperature may be computed based on a chip power consumption and the chip thermal resistance, such as $T_{chip} = P_{chip} \times \theta_{chip}$. Even though the thermal resistances of the respective separate layers are added up to serve as the lower layer thermal resistance or the upper layer thermal resistance, the disclosure is not limited thereto. In another embodiment, a weight may be assigned to the thermal resistance of each of the separate layers. Then, the weighted thermal resistances of the respective separate layers are added up to serve as the lower layer thermal resistance or the upper layer thermal resistance.

In view of the foregoing, in the chip temperature computation method and the chip temperature computation device according to the embodiments of the disclosure, the upper layer thermal resistance and the lower layer thermal resistance of the chip in the package structure are computed to obtain the total thermal resistance of the chip. In addition, the chip temperature is computed based on the total thermal resistance. During building of the thermal resistance performance database, the package structure is divided into structures of a plurality of layers, and the thermal resistance performance databases of the respective layers, instead of the thermal resistance performance database of the whole package structure, are built, so as to reduce the amount of data recorded in the performance database. With the thermal resistance performance databases of the respective layers, the thermal resistance performances of the respective layers may be obtained, and the thermal resistance of a layer is converted into the boundary condition of another layer above the layer to compute the thermal resistance performance of the another layer above the layer. Accordingly, the upper layer thermal resistance and the lower layer thermal resistance of the chip within the package structure are able to be computed within seconds, the total thermal resistance of the chip is thus obtained, and the chip temperature is thus computed. Besides, the computation exhibits a high accuracy of greater than 95%.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A chip temperature computation method for computing a temperature of a chip in a package structure, wherein the package structure comprises the chip, at least one upper layer of the chip, and a plurality of lower layers of the chip, the chip temperature computation method comprises:
   computing an upper layer thermal resistance corresponding to the at least one upper layer and a lower layer thermal resistance corresponding to the plurality of lower layers; and
   computing a total thermal resistance of the chip based on the upper layer thermal resistance and the lower layer thermal resistance, and computing a temperature of the chip based on the total thermal resistance,
   wherein the computing the lower layer thermal resistance comprises:
   building a thermal resistance performance database and an equivalent material parameter of each layer of the plurality of lower layers;
   obtaining a boundary condition of an $N^{th}$ layer of the plurality of lower layers; and
   obtaining a thermal resistance of the $N^{th}$ layer based on the boundary condition and the equivalent material parameter of the $N^{th}$ layer and the thermal resistance performance database of the $N^{th}$ layer, and converting the thermal resistance of the $N^{th}$ layer into a boundary condition of an $N+1^{th}$ layer of the plurality of lower layers, wherein a distance between the $N^{th}$ layer and the chip is greater than a distance between the $N+1^{th}$ layer and the chip.

2. The chip temperature computation method as claimed in claim 1, wherein the computing the lower layer thermal resistance further comprises:
   obtaining the lower layer thermal resistance by adding up thermal resistances of respective lower layers of the plurality of lower layers and adding a boundary condition thermal resistance corresponding to the plurality of lower layers, wherein the boundary condition thermal resistance is obtained based on a boundary condition of a first layer of the plurality of lower layers and a cross-sectional area of the first layer.

3. The chip temperature computation method as claimed in claim 1, wherein the computing the upper layer thermal resistance comprises:
   building the thermal resistance performance database and the equivalent material parameter of the at least one upper layer;
   obtaining a boundary condition of an $M^{th}$ layer of the at least one upper layer;
   obtaining a thermal resistance of the $M^{th}$ layer based on a boundary condition and an equivalent material parameter of the $M^{th}$ layer and a thermal resistance performance database of the $M^{th}$ layer, and converting the thermal resistance of the $M^{th}$ layer into a boundary condition of an $M+1^{th}$ layer of the at least one upper layer, wherein a distance between the $M^{th}$ layer and the chip is greater than a distance between the $M+1^{th}$ layer and the chip; and
   obtaining the upper layer thermal resistance based on the thermal resistance of each layer of the at least one upper layer.

4. The chip temperature computation method as claimed in claim 1, wherein the converting the thermal resistance of the $N^{th}$ layer into the boundary condition of the $N+1^{th}$ layer of the lower layers comprises:
   obtaining the boundary condition of the $N+1^{th}$ layer based on a thermal resistance of the $N^{th}$ layer and a cross-sectional area of the $N+1^{th}$ layer or obtaining the boundary condition of the $N+1^{th}$ layer based on the thermal resistance of the $N^{th}$ layer, the thermal resistance of an $N-1^{th}$ layer, and the cross-sectional area of the $N+1^{th}$ layer.

5. The chip temperature computation method as claimed in claim 1, wherein the obtaining the thermal resistance of the $N^{th}$ layer based on the boundary condition and the equivalent material parameter of the $N^{th}$ layer and the thermal resistance performance database of the $N^{th}$ layer comprises:
   inputting the boundary condition and the equivalent material parameter of the $N^{th}$ layer into the thermal resistance performance database of the $N^{th}$ layer, and obtaining the thermal resistance of the $N^{th}$ layer based on a machine learning module, wherein the machine learning module comprises a neural network algorithm, a decision tree algorithm, or a random forest algorithm.

6. The chip temperature computation method as claimed in claim 1, wherein the thermal resistance performance database of each layer of the lower layers is built by adopting an analytical solution, a semi-empirical solution, or a computer simulation method.

7. The chip temperature computation method as claimed in claim 1, wherein the at least one upper layer comprises a mold layer, and the plurality of lower layers comprise a printed circuit board layer, a bump layer, and a redistribution layer.

8. A chip temperature computation device for computing a temperature of a chip in a package structure, wherein the package structure comprises the chip, at least one upper layer of the chip, and a plurality of lower layers of the chip, the chip temperature computation device comprises:
   a processor; and
   a memory coupled to the processor, wherein the processor is configured to:
   obtain a lower layer thermal resistance corresponding to the plurality of lower layers based on a boundary condition, a thermal resistance performance database, and an equivalent material parameter of each layer of the plurality of lower layers;

obtain an upper layer thermal resistance corresponding to the at least one upper layer based on a boundary condition, a thermal resistance database, and an equivalent material parameter of the at least one upper layer; and compute a temperature of the chip based on the lower layer thermal resistance and the upper layer thermal resistance, wherein a thermal resistance of an $N^{th}$ layer of the plurality of lower layers is associated with the boundary condition of an $N+1^{th}$ layer of the plurality of lower layers, and a distance between the $N^{th}$ layer and the chip is greater than a distance between the $N+1^{th}$ layer and the chip.

9. The chip temperature computation device as claimed in claim 8, wherein the processor is further configured to:

obtain the boundary condition of the $N^{th}$ layer of the plurality of lower layers; and obtain the thermal resistance of the $N^{th}$ layer based on the boundary condition and the equivalent material parameter of the $N^{th}$ layer and the thermal resistance performance database of the $N^{th}$ layer, and convert the thermal resistance of the $N^{th}$ layer into the boundary condition of the $N+1^{th}$ layer of the plurality of lower layers; and obtain the lower layer thermal resistance based on the thermal resistance of each layer of the plurality of lower layers.

10. The chip temperature computation device as claimed in claim 9, wherein the processor obtains the lower layer thermal resistance by adding up the thermal resistances of the respective lower layers of the plurality of lower layers and adding a boundary condition thermal resistance corresponding to the plurality of lower layers, wherein the boundary condition thermal resistance is obtained based on the boundary condition of a first layer of the plurality of lower layers and a cross-sectional area of the first layer.

11. The chip temperature computation device as claimed in claim 9, wherein the processor is further configured to:

build the thermal resistance performance database and the equivalent material parameter of the at least one upper layer;

obtain a boundary condition of an $M^{th}$ layer of the at least one upper layer;

obtain a thermal resistance of the $M^{th}$ layer based on the boundary condition and an equivalent material parameter of the $M^{th}$ layer and a thermal resistance performance database of the $M^{th}$ layer, and convert the thermal resistance of the $M^{th}$ layer into a boundary condition of an $M+1^{th}$ layer of the at least one upper layer, wherein a distance between the $M^{th}$ layer and the chip is greater than a distance between the $M+1^{th}$ layer and the chip; and obtain the upper layer thermal resistance based on the thermal resistance of each layer of the at least one upper layer.

12. The chip temperature computation device as claimed in claim 9, wherein the processor obtains the boundary condition of the $N+^{th}$ layer based on the thermal resistance of the $N^{th}$ layer and a cross-sectional area of the $N+1^{th}$ layer, or obtains the boundary condition of the $N+1^{th}$ layer based on the thermal resistance of the $N^{th}$ layer, a thermal resistance of an $N-1^{th}$ layer of the plurality of lower layers, and the cross-sectional area of the $N+1^{th}$ layer.

13. The chip temperature computation device as claimed in claim 9, wherein the processor inputs the boundary condition and the equivalent material parameter of the $N^{th}$ layer into the thermal resistance performance database of the $N^{th}$ layer, and obtains the thermal resistance of the $N^{th}$ layer based on a machine learning module, wherein the machine learning module comprises a neural network algorithm, a decision tree algorithm, or a random forest algorithm.

14. The chip temperature computation device as claimed in claim 9, wherein the thermal resistance performance database of each layer of the plurality of lower layers is built by adopting an analytical solution, a semi-empirical solution, or a computer simulation method.

15. The chip temperature computation device as claimed in claim 9, wherein the at least one upper layer comprises a mold layer, and the plurality of lower layers comprise a printed circuit board layer, a bump layer, and a redistribution layer.

* * * * *